United States Patent [19]
Witzko

[11] Patent Number: 4,888,245
[45] Date of Patent: Dec. 19, 1989

[54] FLUOROPLASTIC COATING WITH A FILLER OF ACTIVATED CARBON FOR PREVENTING CORROSION

[75] Inventor: Richard Witzko, Egliing, Fed. Rep. of Germany

[73] Assignee: W. L. Gore & Associates, Inc., Newark, Del.

[21] Appl. No.: 169,634

[22] Filed: Mar. 17, 1988

[51] Int. Cl.$^4$ .............................................. B32B 15/08
[52] U.S. Cl. .................................... 428/421; 428/422; 428/463
[58] Field of Search ........................ 428/463, 422, 421

[56] References Cited
U.S. PATENT DOCUMENTS

| | | | |
|---|---|---|---|
| 4,620,995 | 11/1986 | Otomo et al. | 428/422 X |
| 4,749,625 | 6/1988 | Obayashi et al. | 428/463 X |
| 4,770,927 | 9/1988 | Effenberger et al. | 428/422 X |

Primary Examiner—Thomas J. Herbert
Attorney, Agent, or Firm—W.L. Gore and Associates, Inc.

[57] ABSTRACT

A multilayer coating system for protecting metal surfaces comprising a multilayer coating of fluoroplastics in which at least one intermediate layer contains a porous filler, in particular activated carbon.

4 Claims, 1 Drawing Sheet

FLUOROPLASTIC COATING WITH A FILLER OF ACTIVATED CARBON FOR PREVENTING CORROSION

FIELD OF THE INVENTION

The present invention relates to the protection of metal surfaces from corrosion by multilayer coatings with fluoroplastics.

BACKGROUND OF THE INVENTION

Fluoroplastic coatings as protection against corrosion for containers and pipes were developed only about fifteen years ago. They have excellent chemical and physical properties. The strong fluorine-carbon bond and the almost complete shielding of the carbon chains by the fluorine atoms result in universal chemical resistance of the fluoroplastics. The latter are also characterized by temperature stability in the range of about 150° C. to 300° C.

However, the coatings consisting of these materials show different behavior. Due to their thermoplastic nature these fluoroplastics have a certain degree of permeability for gas or vapor molecules at higher temperatures. This permeability depends on the thickness of the layer and on the given temperature. An increase in layer thickness reduces diffusion; an increase in temperature increases it. For these reasons, long-lasting protection against corrosion could not be realized up to now by coatings with fluoroplastics.

It has been proposed to incorporate a barrier in the coatings. The tests were based on the idea of incorporating pigments and fillers to prolong the path of the diffusing material to the metal surface. The protective effect can be improved if the additives have a barrier effect due to their specific particle shape (for example tabular pigment particles) and appropriate orientation in the layer. However, such additives are not suitable for plastic coatings since they are not chemically resistant. Furthermore, the diffusion path is only prolonged; this does not solve the problem of preventing diffusion. The production of greater layer thicknesses was not possible up to now for technical reasons. Using the conventional methods of protecting containers or pipes against corrosion by coating them with fluoroplastics, layer thicknesses of only about 0.5 mm have been obtained, which are too small for sufficient protection against corrosion.

The present invention is therefore based on the problem of producing long-lasting protection against corrosion for containers or pipes by coating them with fluoroplastics.

SUMMARY OF THE INVENTION

The present invention provides for a multilayer coating system with fluoroplastics for protecting metal surfaces from corrosion comprising at least one layer located between a cover layer of fluoroplastic and a metal-surface containing activated carbon. The fluoroplastic provides a mixture of polytetrafluoroethylene (PTFE), perfluoroalkoxy (PFA) and perfluoroethylene propylene. The invention further provides that filling ratios of activated carbon are between 15 and 20 percent by weight of the fluoroplastic.

DETAILED DESCRIPTION OF THE INVENTION

Figure 1:
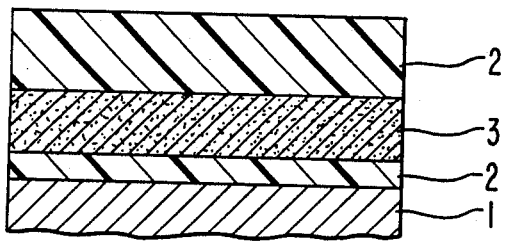
FIG. 1 shows a three-layer coating system made in accordance with the present invention.

This problem is solved according to the invention by producing a multilayer coating of fluoroplastics in which at least one of the layers located between the outer cover layer of fluoroplastic and the metal surface contains a porous filler.

It has turned out, surprisingly enough, that, unlike the compact tabular fillers used up to now, a highly porous, very permeable material such as activated carbon is particularly suitable as a filler for preventing the diffusion of gases and liquids having a corrosive effect. Activated carbon has an unusually large inner surface, is chemically resistant almost universally and has high temperature stability. Other auxiliary agents can be used additionally in the fluoroplastic filler layer for improving the adhesive properties.

The high adsorption power of activated carbon causes retention of the chemicals, and the extremely large surface of activated carbon considerably prolongs the diffusion path for the chemicals. In addition, the diffusion rate is slowed down by the partial pressure change of the diffusing medium in the porous cavities.

In the present invention the amount of activated carbon in the fluoroplastic layer can be varied. The fluoroplastic layer preferably contains 5 to 25 percent by weight of activated carbon. For a layer consisting of activated carbon and fluoroplastic, layer thicknesses of 0.2 to about 2 mm can be obtained using the conventional coating methods. It is expedient to produce a multilayer coating on the metal surface, whereby one of the layers located between the outer cover layer of fluoroplastic and the metal surface preferably contains the porous filler.

Suitable fluoroplastics in this context are polytetrafluoroethylene (PTFE), perfluoroalkoxy (PFA), perfluoroethylene propylene (FEP), copolymers of ethylene and chlorotrifluoroethylene (ECTFE). In the present invention a mixture of PTFE, PFA and FEP is preferably applied to the metal surface, since PTFE alone has a very high melt viscosity and it is very difficult to obtain a uniform layer therewith. By using the aforesaid mixture the flow properties are improved and the danger of cracking prevented.

The present invention shall be explained in more detail with reference to the embodiment in the drawing, without being limited thereto.

In accordance with the figure, a three-layer coating is suitable. Above the metal surface (1) to be protected there is first a thin layer (2) consisting of a mixture of PTFE, PFA and FEP, which is followed by layer (3) formed from this mixture and activated carbon. The layer structure is ended by a further layer (2) consisting of the aforesaid mixture in order to limit the amount of corrosive medium that diffuses into the layer with activated carbon. The thin plastic layer located between the metal surface and the layer with activated carbon is useful for improving the adhesive properties.

Tests were carried out on coated plates, whereby in one series of tests the coating consisted only of the mixture of fluoroplastics (PTFE, PFA, FEP), and in another the coating additionally contained activated carbon. The test conditions and results are summarized below.

EXAMPLE 1

Tests were carried out with 20% hydrochloric acid at a temperature of 145° C. and a pressure of about 4.5 bar. If the coating was only made of PTFE, PFA and FEP, a great decline in adhesion to the metal and medium rust formation could be observed after 24 hours. The coating additionally containing activated carbon showed no change even after four weeks.

EXAMPLE 2

Tests were carried out with water at a temperature of 140° C. and a pressure of about 4 bar. The coating consisting of PTFE, PFA and FEP on the metal surface showed blistering and detachment after three weeks. If the coating additionally contained activated carbon, no change could be detected in the coating after three weeks.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A multilayer coatings system for protecting metal surfaces from corrosion comprising at least one layer of fluoroplastic and activated carbon over a metal surface and at least one layer of fluoroplastic as an outer surface layer.

2. A multilayer coatings system for protecting metal surfaces according to claim 1 wherein the fluoroplastic of each layer is a mixture of polytetrafluoroethylene (PTFE), perfluoroalkoxy (PFA), and perfluoroethylene propylene (FEP).

3. A multilayer coatings system for protecting metal surfaces according to claims 1 or 2, wherein filling ratios of activated carbon are between 5 and 25 percent by weight of the activate carbon.

4. A multilayer coatings system for protecting metal surfaces comprising three superimposed layers of a first fluoroplastic layer over the metal surface, an intermediate fluoroplastic layer containing activated carbon, and an outer fluoroplastic layer.

* * * * *